United States Patent
Weber et al.

(10) Patent No.: US 6,926,604 B2
(45) Date of Patent: Aug. 9, 2005

(54) HARVESTING MACHINE

(75) Inventors: Konrad Weber, Rehlingen-Siersburg (DE); Juergen Hofer, Grossbundenbach (DE)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 10/673,990

(22) Filed: Sep. 29, 2003

(65) Prior Publication Data

US 2004/0060273 A1 Apr. 1, 2004

(30) Foreign Application Priority Data

Sep. 30, 2002 (DE) .......................................... 102 45 885

(51) Int. Cl.$^7$ .......................... A01D 75/18; A01F 12/16; A01F 21/00
(52) U.S. Cl. ......................................................... 460/6
(58) Field of Search ..................... 460/6, 3; 56/10.2 R, 56/10.2 J, 10.3, 10.6, 10.9

(56) References Cited

U.S. PATENT DOCUMENTS

| | | | |
|---|---|---|---|
| 5,488,817 A | * | 2/1996 | Paquet et al. ............ 56/10.2 R |
| 5,901,535 A | | 5/1999 | Duckinghaus et al. ... 56/10.2 G |
| 6,052,978 A | | 4/2000 | Kempf ......................... 56/119 |
| 6,073,428 A | * | 6/2000 | Diekhans ................. 56/10.2 R |
| 6,138,932 A | * | 10/2000 | Moore .......................... 241/92 |
| 6,315,658 B1 | * | 11/2001 | Weber .......................... 460/6 |
| 6,318,056 B1 | | 11/2001 | Rauch et al. ............. 56/10.2 J |
| 6,446,889 B1 | * | 9/2002 | Moore .......................... 241/92 |
| 2001/0037638 A1 | | 11/2001 | Krone et al. .................. 56/504 |

FOREIGN PATENT DOCUMENTS

| | | |
|---|---|---|
| DE | 196 32 977 A | 8/1993 |
| WO | WO 01 65919 A | 9/2001 |

* cited by examiner

*Primary Examiner*—Árpád Fabián Kovács

(57) ABSTRACT

A forage harvester includes feed rolls operable to convey crop to a crop cutter drum. The forage harvester is provided with a control arranged to produce a controller output signal based upon a sensed number of rotations of the crop cutter drum or the feed rolls. The controller output signal operates such that a difference between an actual relation between the feed roll and cutter drum speeds and a nominal relation is at least reduced. The control is operable to produce the controller output signal independent from a detection of the speed of the feed rolls or the chopper drum. The speed of the feed rolls or chopper drum is hence controlled without feedback, but with an open loop. Thus, a sensor is saved and control oscillations are avoided.

5 Claims, 2 Drawing Sheets

HARVESTING MACHINE

FIELD OF THE INVENTION

The invention relates to a harvesting machine with a supply device that can be operated in such a manner as to feed crop to a crop processing device and an integrated control for the supply device and crop processing device.

BACKGROUND OF THE INVENTION

DE 196 32 977 A describes a field chopper of the initially cited type in which the rotational speeds of the chopper drum and of the draw-in or feed rollers are detected by sensors. The quotient of the rotational speeds, that is a measure for the cut length of the chopped crop, is compared with a given desired value. In case of a deviation from the desired value, the rotational speed of the draw-in rollers and/or of the chopper drum is varied in such a manner that the difference between the desired and the actual rotational speed ratio is at least reduced. To this end, the chopper drum and/or the draw-in rollers are hydraulically driven. The speed of these elements is therefore regulated, which can entail disadvantageous fluctuations of control. Moreover, a sensor for the rotational speed of the draw-in rollers is necessary that must be arranged at a position at which it is exposed to the influence of vibrations and plant juices. It thus has a relatively short service life unless resort is made to very expensive embodiments.

SUMMARY OF THE INVENTION

According to the present invention, there is provided an improved control for keeping the cut length in a field chopper constant.

An object of the invention is to provide a harvesting machine with a control for the speed of the crop processing device or the crop feed or supply device so as to maintain a desired length of cut, with the control including a controller output that is generated independently of a detection of the rotational speed of the supply device or of the crop processing device.

It is suggested that the control generate a controller output for the supply device that is not based on a measured rotational speed or transport speed of the supply device. Thus, an open loop is used for which no sensor is required for detecting the speed of the supply device. The speed of the supply device is adapted automatically to a changed speed of the crop processing device. Alternatively, the rotational speed of the crop processing device is controlled independently of a measuring of its rotational speed.

In this manner, a sensor for detecting the rotational speed of the supply device or of the crop processing device that has to be arranged at a position at which it would be exposed to vibrations and influences of plant juices becomes superfluous. No fluctuations of control are to be expected in the harvesting machine of the invention because there is no feedback.

Information about the rotational speed of the crop processing device and of the desired value of the ratio between the rotational speed or transport rotational speed of the supply device and the rotational speed of the crop processing device are supplied to the control. In the instance of a chopping crop processing device, this ratio contains information about the cut length. Using the two pieces of information or signals cited, the control determines the controller output that is fed to the supply device. A table or list or an algorithm (that is, equations with which the controller output is calculated) can be used thereby in order to derive the controller output from the two pieces of information. It would also be conceivable, for the rest, to detect the rotational speed of the supply device, and based on it and the desired rotational speed ratio, to generate a controller output independently of the rotational speed of the crop processing device that effects an adaptation of the rotational speed of the crop processing device.

In various embodiments, the drive output of the supply device or of the crop processing device is completely or partially made available from a hydrostatic drive motor that makes possible an adjustable output rotational speed. Such a drive motor is generally supplied by a pump with hydraulic fluid standing under pressure. The rotational speed at which the pump is driven influences to a certain extent the rotational speed of the drive motor. It therefore seems logical to supply the control with information about the rotational speed at which the pump is driven. The control determines the controller output for the supply device or the crop processing device using this information, so that the influence of the drive rotational speed of the pump is taken into consideration.

In explicit terms, the drive motor can drive the supply device or the crop processing device directly or via a transmission connected in between them with a fixed or a switchable translation ratio about which the control has information or which is detected in the instance of a switchable transmission via a sensor connected to the control for detecting the switching position and/or the translation ratio of the transmission. In other embodiments, the drive motor drives an element of a planetary transmission. Another element of the planetary transmission is driven mechanically by the internal combustion engine of the harvesting machine. A rotational speed that can be varied by the drive motor is then available for the supply device or the crop processing device on the third element of the planetary transmission.

The pump rotational speed can be detected in particular by a rotational speed sensor for an internal combustion engine. This sensor detects the rotational speed of an internal combustion engine that drives the pump and that has a fixed, known ratio to the pump rotational speed.

The control requires information about the rotational speed of the crop processing device or of the supply device. This information can be determined by a sensor cooperating directly with the crop processing device or the supply device or their drive shaft. It is also conceivable that the sensor detect the rotational speed of an element that is driven by or drives the crop processing device or the supply device such as, e.g., an internal combustion engine.

Alternatively, it is suggested that the control can learn the rotational speed ratio from two sensors set to detect rotational speed, e.g., when the harvesting machine is first started up or at regular intervals, and can store it. If one of the sensors fails, the control can fall back on the other sensor. Such an arrangement can be used with sensors that are set to detect the rotational speed of the crop processing device and/or of the supply device and that generate a controller output based on the signals of these sensors.

The invention is particularly suited for achieving a constant cut length in field choppers. However, it can also be used in hay balers with cutting implements or can assure in combines that the crop makes contact with threshing elements of a threshing drum at constant intervals.

BRIEF DESCRIPTION OF THE DRAWINGS

The drawings show an exemplary embodiment of the invention that is described in detail in the following.

DESCRIPTION OF THE PREFERRED EMBODIMENT

Figure 1:
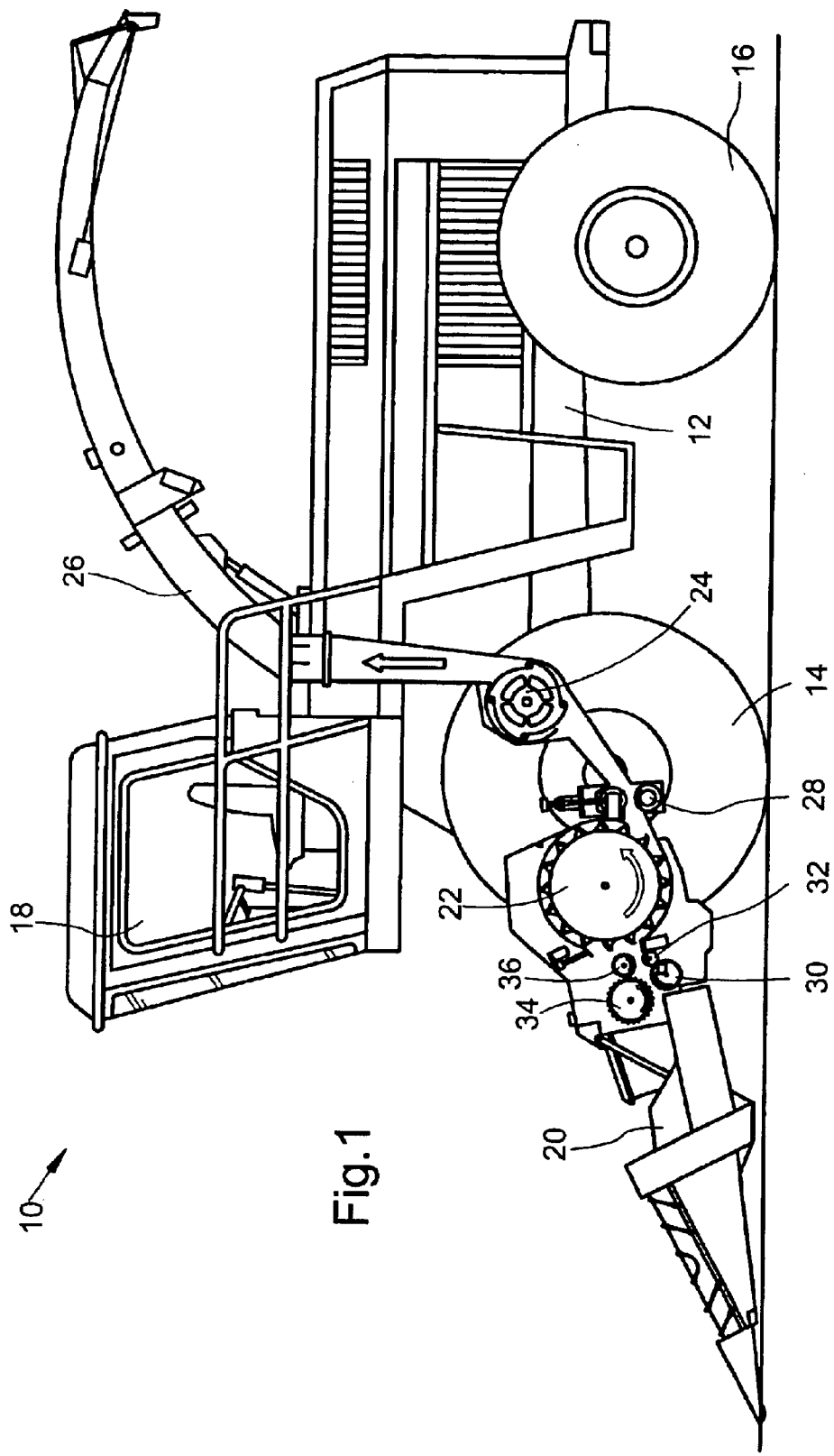
FIG. 1 is a schematic, left side view of a harvesting machine with which the present invention is particularly adapted for use.

Referring now to FIG. 1 there is shown a harvesting machine 10, here depicted as a self-propelled field chopper including a frame 12 carried by front and rear wheels 14, 16. Harvesting machine 10 is operated from operator cabin 18 from which the operation of a crop receiving device 20 can be viewed. A crop, e.g., corn, grass or the like, taken up from the ground by crop receiving device 20 is fed by four draw-in or feed rollers 30, 32, 34, 36 to a chopper drum 22 that chops the crop into small pieces and transfers it to a conveyor device 24. The crop leaves harvesting machine 10 and goes to a trailer moving at the side via a discharge chute 26, which is mounted for being selectively pivoted about an upright axis. A post-comminution device, such as a kernel processor, includes two cooperating rollers 28 positioned between chopper drum 22 and conveyor device 24 for receiving chopped crop from the chopper drum and transporting processed crop tangentially to the conveyor device 24.

Figure 2:
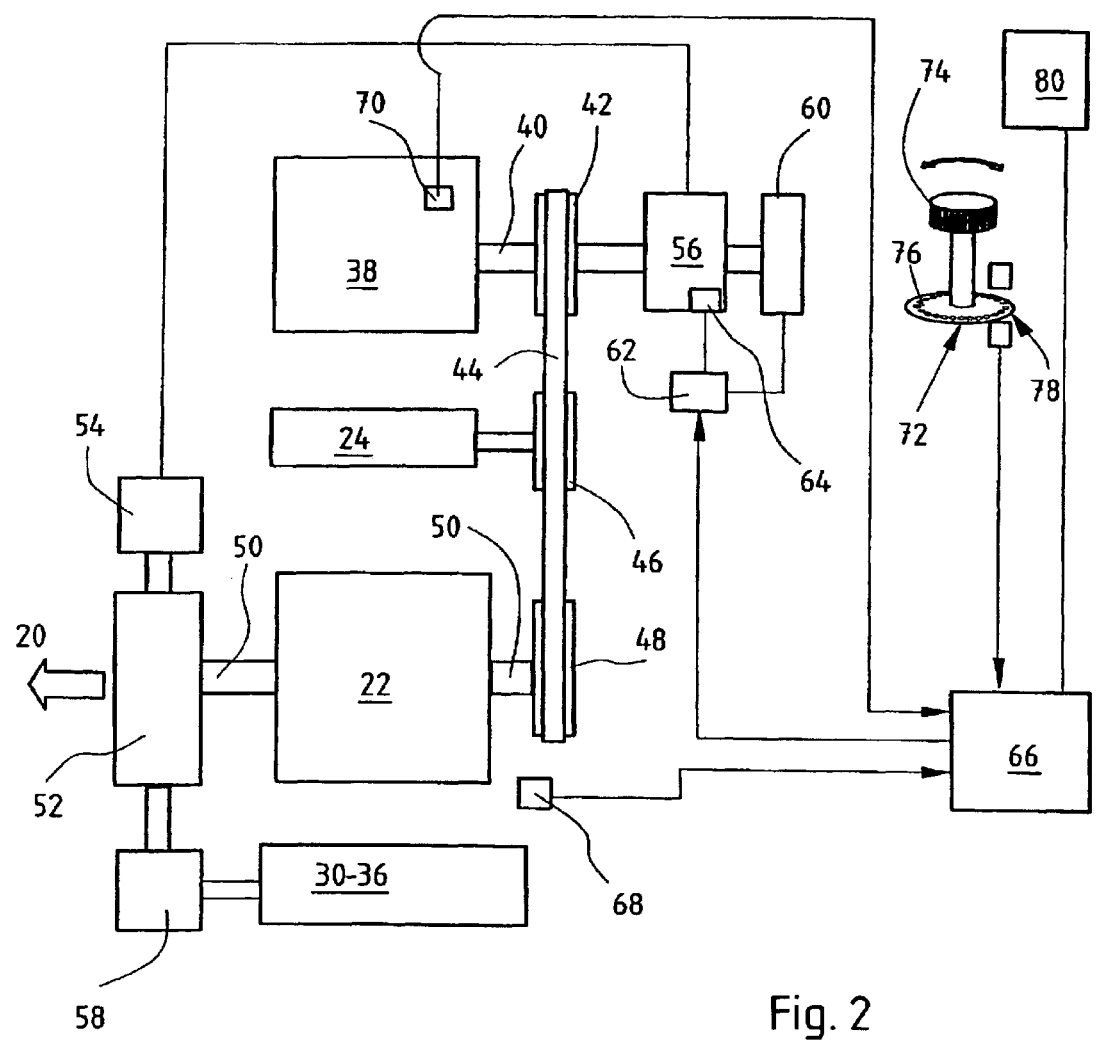
FIG. 2 is a schematic representation of the drive of the chopper drum and of the draw-in rollers of the harvesting machine of FIG. 1.

Referring now to FIG. 2 there is shown the drive devices of the harvesting machine 10. Internal combustion engine 38, generally a diesel engine, makes available the drive power for the advance of the machine 10 over the ground and for the crop processing and transporting elements of harvesting machine 10. The engine 38 has an output shaft 40 coupled to a belt pulley 42, which is coupled by a drive belt 44 to a belt pulley 46, which is coupled to a conveyor device 24. The belt 44 is also in engagement with another belt pulley 48 coupled to a shaft 50 of the chopper drum 22. Moreover, the shaft 50 of chopper drum 22 is connected to cut length transmission 52. Cut length transmission 52 comprises a planetary transmission (not shown) whose ring gear is coupled to shaft 50. The sun gear is driven by hydrostatic drive motor 54 supplied with pressurized hydraulic fluid by a hydrostatic pump 56. Pump 56 is driven by the output shaft 40 of the internal combustion engine 38. The planet gear carrier of the planetary transmission is in a driving connection, via transmission 58, with draw-in rollers 30–36. Crop receiving device 20 is also driven by the cut length transmission 52. The construction and the function of cut length transmission 52 are known from U.S. Pat. No. 6,052,978 and DE 102 07 467 A, whose disclosures have been included by reference in the present application.

Cut length transmission 52 makes it possible to adjust the rotational speed of draw-in rollers 30–36 and therewith the cut length of the chopped crop to a desired value during the harvesting operation by varying the rotational speed of hydrostatic drive motor 54. The mechanical drive thereby makes the greater part of the drive power available via shaft 50 whereas hydrostatic drive motor 54, that can be driven in both directions, makes a variation of the cut length possible. During the harvesting operation, the drive power for crop receiving device 20 is made available only by shaft 50. In order to be able to reverse crop receiving device 20 and draw-in rollers 30–36 in case of a crop backup, the driving connection between chopper drum 22 and output shaft 40 of internal combustion engine 38 is separated in a reverse mode by a coupling (not shown), and the drive power of hydrostatic drive motor 54 is conducted through the planetary transmission in order to drive draw-in rollers 30–36 and crop receiving device 20 in a direction of rotation opposite that of the harvesting operation.

Output shaft 40 of internal combustion engine 38 continues to drive hydrostatic supply pump 60, that is connected via electromagnetic valve assemblage 62 that comprises proportional valves, to a hydromotor or hydrocylinder 64 arranged to adjust a wobble plate of hydrostatic pump 56. As an alternative or an addition, hydrostatic drive motor 54 could be provided with a motor-adjustable wobble plate adjusted by control 66. Electromagnetic valve assemblage 62 makes possible, in accordance with electric signals supplied to it, a variation of the rotational speed of hydrostatic drive motor 54. Supply pump 60 or some other hydrostatic pump continues to make the operating pressure available for hydrostatic wheel drives.

Electromagnetic valve assemblage 62 is connected to the control 66 that is coupled for its part to chopper drum rotational speed sensor 68 and to internal combustion engine rotational speed sensor 70. Chopper drum rotational speed sensor 68 detects the rotational speed of chopper drum 22, e.g., optically by means of a perforated disk rotating with chopper drum 22, or electromagnetically, e.g., by means of a Reed relay that cooperates with one or several magnets attached to chopper drum 22. Internal combustion engine rotational speed sensor 70 can be coupled to an electronic engine control of internal combustion engine 38. Alternatively, it detects the rotational speed of internal combustion engine 38 at output shaft 40 in one of the manners described regarding chopper drum rotational speed sensor 68. Furthermore, control 66 is connected to cut length input device 72. Cut length input device 72 is located in operator cabin 18 and comprises a rotary knob 74 connected to a perforated coding disk 76. Light barrier 78 detects the direction of rotation and rotational speed of the coding disk 76. Cut length input device 72 makes it possible for the operator to supply information about the desired cut length to control 66. Instead of rotary knob 74 and coding disk 76, a potentiometer or a keyboard could also be used as a cut length input device. The adjusted cut length is indicated to the operator by a display device 80 connected to control 66. It could also be conceivable to determine the desired value of the cut length automatically, e.g., by sensors that detect the properties of the crop. In this manner, the cut length can be adjusted automatically to a value at which the crop can be optimally digested. Control 66 is preferably connected by a bus line to cut length input device 72, display device 80, electromagnetic valve assemblage 62, and to chopper drum rotational speed sensor 68 and internal combustion engine rotational speed sensor 70.

Control 66 contains continuous rotational speed information from chopper drum rotational speed sensor 68 and internal combustion engine rotational speed sensor 70. In addition, it receives information about the desired cut length from cut length input device 72. The rotational speed of hydrostatic drive motor 54 required to achieve the desired cut length, and thus the signals to be supplied to electromagnetic valve assemblage 62, are a function of the rotational speed of chopper drum 22 and of the number of knives arranged around the circumference of chopper drum 22, that define at which intervals in time the crop is cut. Moreover, the chopper drum rotational speed defines an input rotational speed of the planetary transmission in cut length transmission 52. The rotational speed of hydrostatic drive motor 54 is also a function of the rotational speed of pump 56 that is given by the rotational speed of internal combustion engine 38. Generally, the more rapidly pump 56 is driven, the higher the rotational speed of drive motor 54. Thus, control 66 makes signals available to the electromagnetic valve assemblage that are set using the rotational speed of chopper drum 22 (measured with chopper drum rotational speed sensor 68), the rotational speed of internal combustion engine 38 (measured with internal combustion engine rotational speed sensor 70), and the desired value of the cut length (based on cut length input device 72 or on an automatically determined value). In particular, a table, a characteristic curve field or an algorithm can be stored in the control in order to determine the controller output for electromagnetic valve assemblage 62 from the three input values. As a rule, control 66 determines the signals supplied to valve assemblage 62 digitally and converts them with a digital-analog converter into voltage values that are supplied to the proportional valves of valve assemblage 62. The signals for valve assemblage 62 are thus determined without detecting the rotational speed of draw-in rollers 30 –36. Control 66 sets the rotational speed of draw-in rollers 30–36 at a value that results in the attaining of the desired cut length without using a feedback signal. If the rotational speeds of internal combustion engine 38 and of chopper drum 22 drop, e.g., when excess crop is supplied, control 66 detects this drop from the signals of sensors 68, 70 and brings about that the rotational speed of hydrostatic drive motor 54 is correspondingly lowered so that the cut length remains at least approximately constant. If the rotational speeds of chopper drum 22 and of internal combustion engine 38 subsequently rise again, control 66 analogously brings about an increasing of the rotational speed of hydrostatic drive motor 54.

During reversing, the rotational speed of drive motor 54 is adjusted to a given value. Control 66 also takes into consideration thereby the rotational speed of internal combustion engine 38 detected by internal combustion engine rotational speed sensor 70.

The rotational speeds of chopper drum 22 and of internal combustion engine 38 have a constant ratio defined by the translation of the drive with belt 44. This ratio is constant because, as a rule, no slip makes itself noticable. It would therefore be conceivable to eliminate the signal of one of sensors 68, 70. To this end, only one of sensors 68, 70 can be installed at the factory, whereas information about the translation ratio is programmed into control 66 or is set up beforehand for controlling valve assemblage 62 using only the signal of the remaining sensor. However, it is logical for the case that if one of sensors 68, 70 fails, that control 66 automatically learns the rotational speed ratio of internal combustion engine 38 and chopper drum 22 so that it can derive both rotational speeds from the measured value of only one of sensors 68, 70. To this end, control 66 can detect the rotational speed ratio of the two sensors 68, 70 at certain time intervals, e.g., during the first operation or after certain time intervals. Information about the rotational speed ratio is stored. If one of sensors 68, 70 fails later, which can be recognized from a lacking or obviously incorrect signal (e.g., excessive deviation from a possible rotational speed range), the control derives the rotational speed of the failed sensor from the signal of the remaining sensor.

It should be noted that control 66 is independent of the use of the planetary transmission in cut length transmission 52. Thus, it is also conceivable to drive draw-in rollers 30–36 exclusively by hydrostatic drive motor 54. Moreover, another sensor could feed information about the rotational speed of draw-in rollers 30–36 to control 66. This information can serve, e.g., in case of a failure of both sensors 68, 70 to regulate the rotational speed of draw-in rollers 30–36.

Having described the preferred embodiment, it will become apparent that various modifications can be made without departing from the scope of the invention as defined in the accompanying claims.

What is claimed is:

1. A crop harvesting machine, comprising: a driven crop supply device operable for feeding harvested crop; a driven crop processing device located for receiving crop fed by said crop supply device; an internal combustion engine having an output shaft; a hydrostatic transmission including a variable displacement pump hydraulically coupled to a motor; said motor being coupled for driving said supply device; said pump having an electrically responsive displacement control arrangement and being coupled for being driven by said output shaft; said output shaft being coupled for driving said crop processing device; an electrical control unit for establishing a desired relationship between the speed of said supply device and the speed of said processing device; said displacement control arrangement being coupled to said control unit for receiving a displacement control signal for effecting a change in pump displacement; a speed sensor arrangement located for sensing the speed of at least one of said internal combustion engine output shaft and processing device and being coupled for transmitting an electrical signal representative of the sensed speed to said control unit; said electrical control unit being preprogrammed with a desired speed relationship between the respective speeds of said crop processing device and said supply device; and said control unit being responsive to said electrical signal and to said desired speed relationship for generating a control output signal that brings about a change in the rotational speed of said supply device such that the difference between the actual rotational speed ratio of the supply device and crop processing device and the desired rotational speed ratio is at least reduced.

2. The harvesting machine, as defined by claim 1, wherein said preprogrammed speed relationship established in said control unit so as to determine the control output signal is accomplished by providing said control unit with one of a table or an algorithm.

3. The harvesting machine, as defined in claim 1, and further including a transmission having an input shaft coupled to said motor and an output shaft coupled to said supply device; and said transmission being one of a shiftable gear transmission, or a planetary transmission comprising an element driven mechanically by said internal combustion engine.

4. A The harvesting machine, as defined in claim 1, wherein said speed sensor arrangement includes at least two speed sensors respectively located for detecting the rotational speed of the supply device and the crop processing device; said control unit being connected to said at least two speed sensors; and said control unit being operable for detecting and storing the rotational speed ratio of the two sensors in order to be able, if one of the sensors fails, to fall back on the remaining sensor.

5. The harvesting machine, as defined in claim 1, wherein said crop processing device is a chopper drum; said supply device comprises draw-in rollers, whereby control of the rotational speed of the draw-in rollers by said control unit results in the achievement of a desired value for the cut length.

* * * * *